United States Patent
Chen

(10) Patent No.: US 9,431,058 B2
(45) Date of Patent: Aug. 30, 2016

(54) VIDEO PLAYING SYSTEM AND METHOD THEREOF, AND COMPUTER-READABLE RECORDING MEDIUM

(75) Inventor: Chia-Heng Chen, Kaohsiung (TW)

(73) Assignee: CYBERLINK CORP., Shindian, Taipei (TW)

( * ) Notice: Subject to any disclaimer, the term of this patent is extended or adjusted under 35 U.S.C. 154(b) by 1978 days.

(21) Appl. No.: 12/057,073

(22) Filed: Mar. 27, 2008

(65) Prior Publication Data

US 2009/0249404 A1    Oct. 1, 2009

(51) Int. Cl.
*G06F 3/0482* (2013.01)
*G11B 27/10* (2006.01)
*G06F 3/0481* (2013.01)
*G11B 20/10* (2006.01)

(52) U.S. Cl.
CPC ......... *G11B 27/105* (2013.01); *G06F 3/04817* (2013.01); *G11B 2020/10537* (2013.01); *G11B 2220/2562* (2013.01)

(58) Field of Classification Search
USPC ............................................ 725/58; 386/200
See application file for complete search history.

(56) References Cited

U.S. PATENT DOCUMENTS

| 6,642,939 | B1 * | 11/2003 | Vallone et al. | 715/721 |
| 7,120,351 | B2 * | 10/2006 | Engle et al. | 386/239 |
| 7,366,401 | B2 * | 4/2008 | Ohmori | 386/239 |
| 7,715,693 | B2 * | 5/2010 | Miyajima et al. | 386/239 |
| 2004/0088728 | A1 * | 5/2004 | Shimizu | 725/89 |
| 2006/0013557 | A1 * | 1/2006 | Poslinski | 386/46 |
| 2008/0092168 | A1 * | 4/2008 | Logan et al. | 725/44 |

OTHER PUBLICATIONS

A Karmouch, J Emery—A playback schedule model for multimedia documents, IEEE, 1996—vol. 3, Issue: 1, pp. 50-61.*

* cited by examiner

*Primary Examiner* — Izunna Okeke
*Assistant Examiner* — Ali Shayanfar
(74) *Attorney, Agent, or Firm* — McClure, Qualey & Rodack, LLP

(57) ABSTRACT

A video playing system and a method thereof are described. When the video playing system randomly plays sections of a multimedia video, it can control scheduled events in-between so as to ensure the user does not miss important events when an important blocking effect exists in the multimedia video schedule. During the random playing of the multimedia video, the video playing system will detect the scheduled event(s) between an original playing position and a new playing position. Then, the video playing system will execute the earliest scheduled event between the original playing position and the new playing position, or execute all of the scheduled events in sequence.

13 Claims, 4 Drawing Sheets

VIDEO PLAYING SYSTEM AND METHOD THEREOF, AND COMPUTER-READABLE RECORDING MEDIUM

BACKGROUND OF THE INVENTION

1. Field of the Invention

The present invention relates to a video playing system and a method thereof, a computer readable recording medium, and more particularly to a system and a method for playing large-capacity multimedia video data of a scheduled event with an important blocking effect, and a computer readable recording medium.

2. Description of Related Art

Digital Versatile Discs (DVDs) are an information storage medium used for storing pre-recorded sound information, movies and computer software, etc. The hardware architecture for the storage and playing of DVDs is very similar to the hardware architecture for the storage and playing of compact discs (CDs), but the storage capacity of a DVD is much larger than the storage capacity of a CD. DVDs come with different storage capacities according to different manufacturing technologies. A single-layer manufacturing technology provides a capacity of 4.7 gigabytes (G), and a double-layer technology provides a capacity of 9.4. Double-layer technology can provide a capacity of up to 8.5 G for each layer, so that a DVD is not only suitable for storing audio information, but also suitable for storing video information and large quantities of computer data.

High Definition DVDs (HD DVDs) are a new-generation DVD format compatible with the DVD format and provide an even larger information storage space than DVDs. HD DVDs' capacity is up to 15 G for a single-layer HD DVD, 30 G for a double-layer HD DVD, and 45 G for a multi-layer HD DVD. Furthermore, these HD DVDs can provide images with higher resolution, better audio quality and interactive video functions.

The common DVD for storing video information is called a DVD-VIDEO disc. The storage capacity of a DVD-VIDEO disc is very large. The information compression technology has become well developed in recent years so that DVD-VIDEO discs can provide better image quality and sound effects than a conventional CD video optical disc.

DVD-VIDEO discs operate together with a navigation engine to play interactive movies. The navigation engine retrieves a file from a DVD-VIDEO disc according to a preset directory structure to execute related video contents. Each DVD-VIDEO disc includes a main directory, and a general directory labeled as a VIDEO_TS directory, which includes two kinds of files with file extension names of .IFO (hereinafter referred to as an IFO file) and .VOB (hereinafter referred to as a VOB file). During the playing of a DVD, these files are stored as a video title set by the DVD player. All the files required for the video title are grouped together, and each video title set is composed of an IFO file and at least one VOB file.

The VOB file is called a video object set that includes the actual multimedia data. The position and format for storing multimedia data into the video object set are defined according to the IFO file. The IFO file includes a navigational data structure and a translation language. The translation language is used to describe how the structure of the multimedia data is arranged and planned.

The structure of the multimedia data includes program chain objects, program objects, and cell objects. In a title, a program chain object is linked to related program objects and the playing of the program object is determined by the data structure of the program chain object. For example, a single title includes only a program chain object, and a complex title includes a plurality of program chain objects and allows random access to various different programs objects. The titles of several program chains objects can play various different programs objects in a linear mode, a random mode, or a shuffle mode.

Each program object in a program chain object includes a plurality of cell objects. These cell objects are used for instructing a DVD player to decode a specific multimedia data in one of the VOB files. The data structure of the cell object is defined as an IFO file and the multimedia content is created in the VOB file. Each cell object instructs the DVD player to start playing at a specific position of the VOB file, and thus it is called a video object unit (VOBU). The so-called video object unit is a container object containing guide data and multimedia data.

A general DVD or an HD DVD playing program has a video seeking bar. The video pointer on the video seeking bar can be shuffled by users to randomly navigate the multimedia data played by the playing program. For instance, if the playing program plays a DVD or an HD DVD multimedia data, and a user operates the video pointer on the video seeking bar, then the playing program will jump to a new position of the multimedia data structure and will start playing the video data at the new position.

Although users can randomly select to navigate their desired video section through the video seeking bar on the playing program, some of the important video sections may be missing. In the multimedia data structure of the DVD (or HD DVD) format, the program chain object under a title includes a plurality of program objects. For example, the video schedule of a movie inserts some special events in the movie through the video object unit to enrich the content of a plot, and special events include plot analysis, selection of multiple views, and interactive plot, etc. The scheduled events are divided mainly into the event with a non-blocking effect and the event with an important blocking effect. The former refers to the effect that allows users to randomly select a video section and the effect will not affect the video playing mechanism. The latter refers to an effect that must exist or be executed, or else it will substantially restrict the playing mechanism. In a movie playing procedure, if a user operates the video pointer on the video seeking bar to jump the original time position of the movie to another time position, then a special event with an important blocking effect between the two time positions will be missed. Thus, ingenious ideas, related plots and special effects of a movie cannot be shown in the movie. Alternatively, a supplementary dialogue elimination event remains in the video that follow due to the elimination of the special event with an important blocking effect, thus seriously affecting the navigation effect, further affecting the video contents that follow, or ruining the playing mechanism. As a result, the multimedia video playing becomes incomplete.

SUMMARY OF THE INVENTION

In view of the foregoing shortcoming of the prior art, the present invention provides a video playing method for playing multimedia video data. The multimedia video data includes at least one scheduled event. Firstly, a first playing position and a second playing position of the multimedia vide data are received; then the multimedia video data between the first playing position and the second playing position is examined to determine whether a scheduled event exists therebetween. If the segment of multimedia video data between the first playing position and the second playing position has a scheduled event with the blocking effect, then the multimedia video data playing position will jump from the first playing position to the position where the first scheduled event occurs. The first scheduled event is the earliest scheduled event that occurs between the first playing position and the second playing position; finally the multimedia video data of the second playing position is played after the first scheduled event is executed.

The present invention provides a video playing method for playing multimedia video data, and the multimedia video data includes at least one scheduled event. Firstly, a first playing position and a second playing position of the multimedia video data being retrieved; then the multimedia video data between the first playing position and the second playing position is examined and it is determined whether a scheduled event exists therebetween. If the multimedia video data between the first playing position and the second playing position has a scheduled event, then the scheduled events are executed sequentially according to the sequence of the schedule events that exist between the first playing position and the second playing position; finally the multimedia video data of the second playing position is played after the last scheduled event between the first playing position and the second playing position is executed.

The present invention provides a video playing system, comprising: a video data providing unit, for providing multimedia video data, wherein the data structure of the multimedia video data includes at least one scheduled event; a video data processing unit, for processing the multimedia video data to play video information according to the data structure of the multimedia video data; a playing position control unit, for selecting a playing position of video information; a playing position detection unit, for detecting a first playing position and a second playing position of the video information; and a scheduled event detection unit, for detecting whether a scheduled event exists between the first playing position and the second playing position. If the scheduled event exists the video data processing unit will be informed to play the detected scheduled event and then play the multimedia video data of the second playing position.

The present invention provides a video playing method, comprising the steps of: playing multimedia video data, wherein the multimedia video data includes at least one scheduled event; detecting whether a random access operation of selecting multimedia video data for the playing has occurred; retrieving a first playing position and a second playing position of the selected multimedia video data, if the random access operation of selecting multimedia video data for the playing occurs; detecting whether a scheduled event exists between the first playing position and the second playing position; and executing the scheduled event between the first playing position and the second playing position and then playing the multimedia video data of the second playing position, if the scheduled event exists between the first playing position and the second playing position.

The present invention provides a computer readable recording medium, such that a computer executes an operation comprising the steps of: playing multimedia video data, wherein the multimedia video data includes at least one scheduled event; detecting whether a random access operation of selecting multimedia video data for a playing occurs; retrieving a first playing position and a second playing position of the selected multimedia video data, if the random access operation of selecting the multimedia video data occurs; detecting whether a scheduled event exists between the first playing position and the second playing position; and playing the multimedia video data of the second playing position after the scheduled event between the first playing position and the second playing position is executed, if the scheduled event exists between the first playing position and the second playing position.

To make it easier for our examiner to understand the innovative features and technical content, we use preferred embodiments together with the attached drawings for the detailed description of the invention, but it should be pointed out that the attached drawings are provided for reference and description but not for limiting the present invention.

DETAILED DESCRIPTION OF THE PREFERRED EMBODIMENTS

Figure 1:
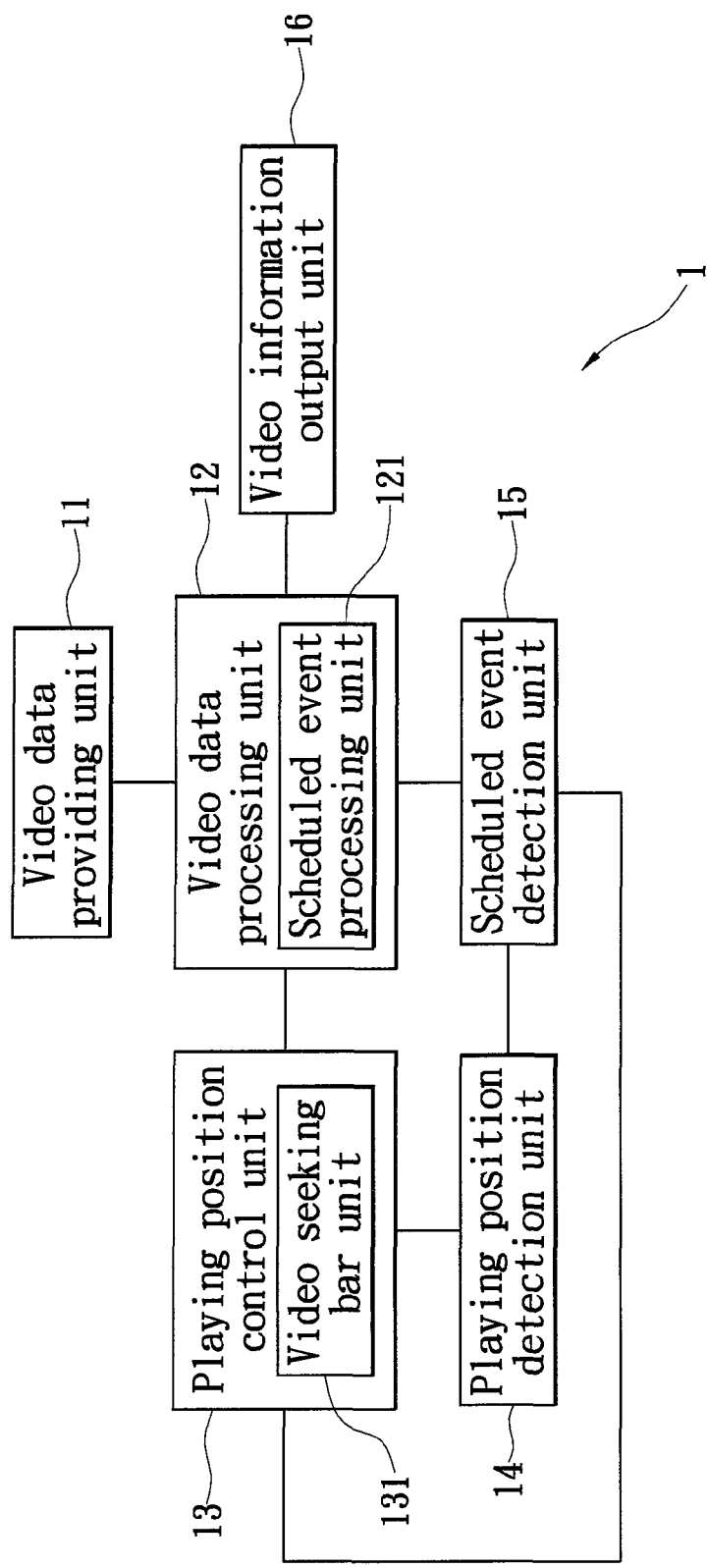
FIG. 1 is a functional block diagram of a video playing system of the present invention.

Please refer to FIG. 1 which shows a functional block diagram of a video playing system of the present invention, the video playing system 1 comprises a video data providing unit 11, a video data processing unit 12, a playing position control unit 13, a playing position detection unit 14, a scheduled event detection unit 15, and video information output unit 16, wherein the video data processing unit 12 includes a scheduled event processing unit 121, and the playing position control unit 13 includes a video seeking bar unit 131.

The video data providing unit 1 provides multimedia video data to the video data processing unit 12 and the video data processing unit 12 processes the multimedia video data to generate video information. The video information output unit 16 is provided for displaying the video information outputted by the video data processing unit 12, wherein the multimedia video data is in a previously arranged video data structure, such as video data in DVD or an HD DVD format. The video data structure includes multimedia functions of at least one scheduled event, such as a picture in picture (PIP) event, a multiple views selection event, an interactive plot event, an evaluation and analysis event, or a function menu event, and the scheduled event is executed by the scheduled event processing unit 121. Some of the scheduled events with the blocking effect must be executed during playing the video, or else it will affect the effect of the playing mechanism that follows and will cause an incomplete multimedia playing.

Therefore, when the video playing system 1 plays the multimedia video data provided by the video data providing unit 11, the video data processing unit 12 processes the video data and the scheduled event according to the data structure of the multimedia video data. Video information is generated by processing the video data and the scheduled event, and the video information output unit 16 displays the video information on a display device (not shown in the figure) for the user to navigate. The video data providing unit 11 can be DVD-VIDEO disc, an HD DVD-VIDEO disc, or a data storage device.

The playing position control unit 13 can use the video seeking bar unit 131 to show the playing time information of the video information. A playing pointer (not shown in the figure) on the video seeking bar unit 131 is provided for selecting a playing time position of the video information and informing the video data processing unit 12 to play the video information of the selected position. The playing position detection unit 14 is provided for detecting the playing position of the selected video information in time scale, which detects an original playing position (hereinafter referred to as "first playing position") and a new playing position (hereinafter referred to as "second playing position") of the randomly selected playing position; wherein the randomly selected playing position can be executed via a user input interface device, such as a mouse (not shown in the figure) to shuffle a playing pointer on the video seeking bar unit 131. The scheduled event detection unit 15 determines whether a scheduled event existing between two time positions according to the information of the first playing position and the second playing position detected by the playing position detection unit 14 and the data structure of the multimedia video data in the video data processing unit 12. For example, the schedule event detection unit 15 parses a first information table, which describes type of events, positions of the events with respect to the video information. Such that, the schedule event detection unit 15 determines if the schedule events existing according to the first playing position, the second playing position, and the first information table. If the scheduled event exists, the scheduled event detection unit 15 will inform the playing position control unit 13 to control the video data processing unit 12, and the video data processing unit 12 will execute the scheduled event between the first playing position and the second playing position via the scheduled event processing unit 121. In addition, the video data processing unit 12 determines if the schedule events has blocking effect by parsing the second information table. The second information table describes the permission/forbiddance of user behaviors with respect to the video information. For example, a segment of the video forbids the fast-forward behavior according to the second information table, thus the events within the specific section of the video are determined if there is a blocking effect.

If video information is randomly selected for navigation by the video playing system 1 of the present invention, the scheduled event between the first playing position and the second playing position will not be ignored, and each event, particularly the event with an important blocking effect of the video information will be shown and executed so that users will definitely receive the contents of each event of the video information. The present invention therefore maintains the quality and integrity of the video playing mechanism.

Figure 2:
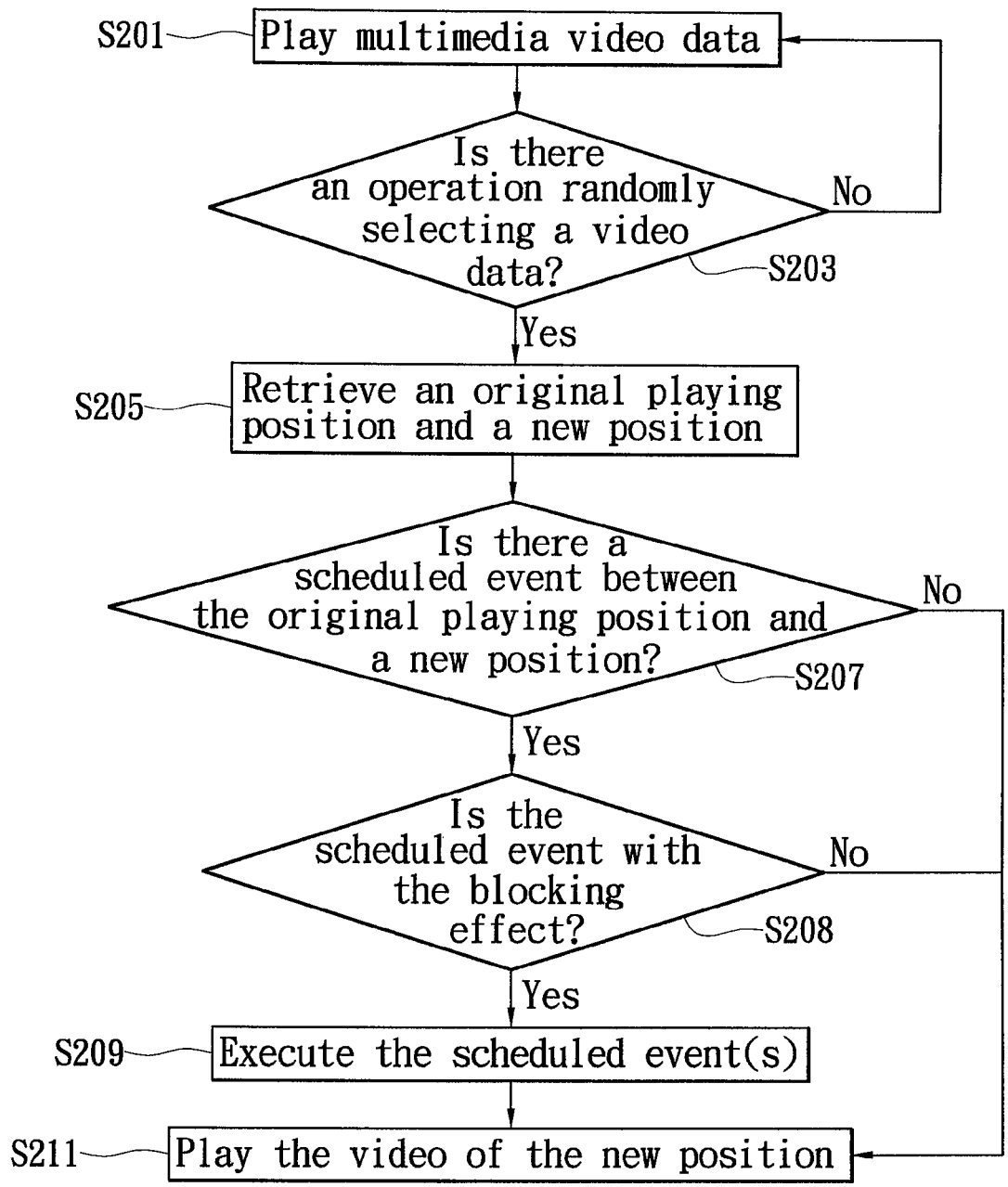
FIG. 2 is a flow chart of a video playing method of the present invention.

The video playing method in accordance with the present invention is described as follows. Referring to FIG. 2, which shows a flow chart of a video playing method of the present invention, the video can be played by the video playing system as shown in FIG. 1, or by a program of the following video playing method stored in a computer readable recording medium and executed by a computer (wherein the computer readable recording medium stores the following program provided for the computer to execute the playing of multimedia video). The video playing method of the invention comprises the steps of: playing multimedia video data, wherein the multimedia video data includes at least one scheduled event (as shown in S201 of FIG. 2); starting to detect whether an operation of randomly accessing multimedia video data has occurred (as shown in S203 of FIG. 2); returning to Step S201, if no operation of randomly accessing multimedia video data as shown in Step S203 occurs, or executing the next step; retrieving an original playing position (a first playing position) and a new playing position (a second playing position) of the randomly selected multimedia video data if an operation of randomly accessing multimedia video data occurs (as shown in S205 of FIG. 2); examining whether a scheduled event exists between the original playing position and the new playing position (as shown in S207 of FIG. 2); jumping to Step S211 if no scheduled event exists between the original playing position and the new playing position in Step S207, or executing the next step if a scheduled event exists; examining if scheduled event has blocking effort (as shown in S208 of FIG. 2); jumping to Step S211 if the scheduled event exists between the original playing position and the new playing position does not have the blocking effect in Step S208; executing the scheduled event between the original playing position and the new playing position, if the scheduled event exists between the original playing position and the new playing position (as shown in S209 of FIG. 2); and playing the new playing position after the video playing of the scheduled event with an important blocking effect is completed (as shown in S211 of FIG. 2).

Figure 3:
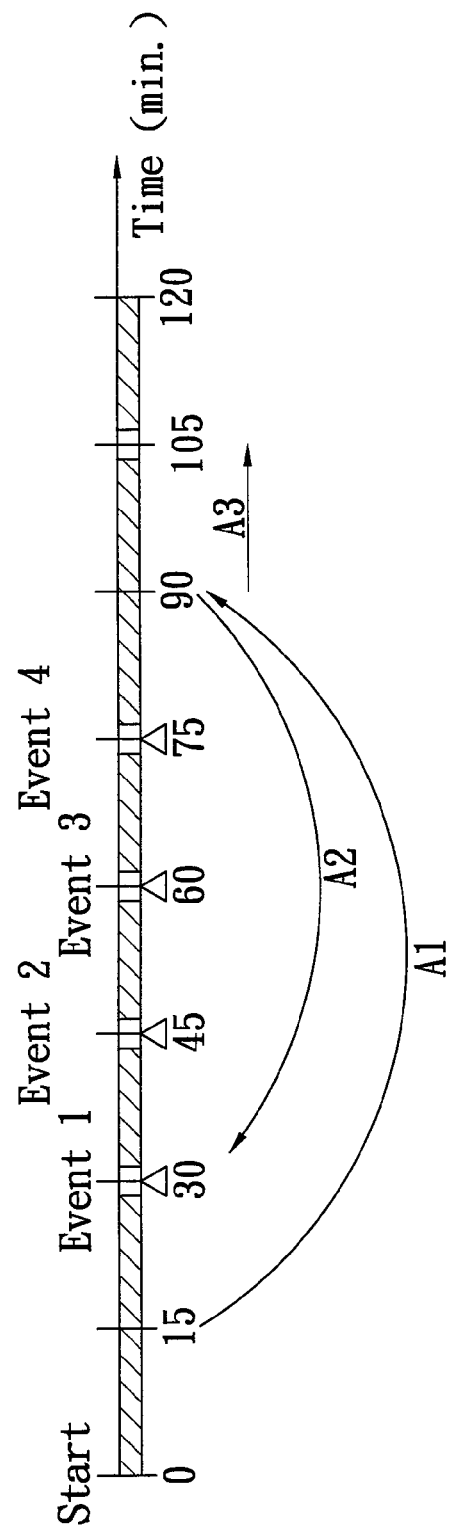
FIG. 3 is a schematic view of a schedule for processing a scheduled event in accordance with an embodiment of the present invention.

Please refer to FIG. 3, which shows a schematic view of a schedule for processing a scheduled event in accordance with a first preferred embodiment of the present invention. A 120-minute schedule of multimedia video data includes Event 1, Event 2, Event 3, Event 4 and Event 5 arranged to be held at the $30^{th}$ min., the $45^{th}$ min., $60^{th}$ min., $75^{th}$ min. and $105^{th}$ min. respectively. Assuming that the multimedia video data has played up to the $15^{th}$ minute, a random access operation is executed so that the playing position jumps from the $15^{th}$ minute (at a first playing position) to the $90^{th}$ minute (at a second playing position) as shown by the arrow in FIG. 3. If the conventional video playing method skips Events 1 to 4 from the $15^{th}$ minute to the $90^{th}$ minute, the information will not be shown. If the aforementioned situation occurs in the present invention, Events 1 to 4 existing between the $15^{th}$ minute and the $90^{th}$ minute will be detected, and the playing will jump to the $30^{th}$ minute to execute Event 1 at the playing position of Event 1 (as indicated by the arrow A2 in FIG. 3). After Event 1 has been executed, the multimedia video data of the $90^{th}$ minute (at a second playing position) is processed (as indicated by the arrow A3 in FIG. 3).

If the playing of multimedia video data is selected randomly, and a scheduled event exists between the first playing position and the second playing position, the video playing system or a computer will jump to the earliest scheduled event between the first playing position and the second playing position according to the executed computer readable recording medium, and then will execute the earliest scheduled event. After the earliest scheduled event is executed, the playing position will jump to the previously selected position for playing the multimedia video data, such as the second playing position of the current embodiment.

Figure 4:
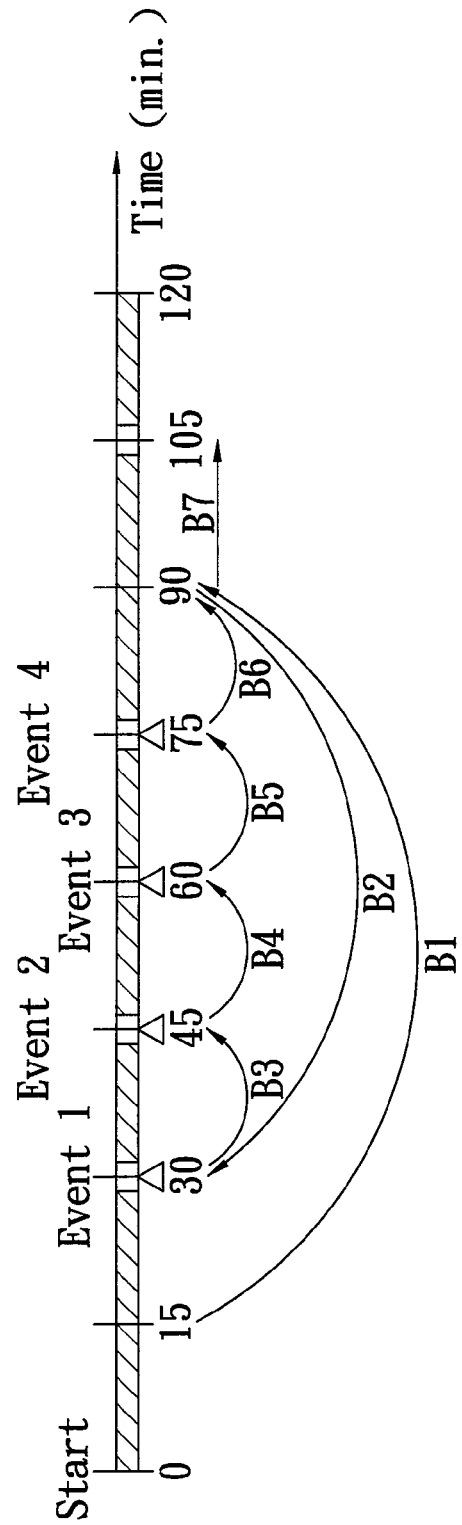
FIG. 4 is a schematic view of a schedule for processing a scheduled event in accordance with an embodiment of the present invention.

Please refer to FIG. 4, which is a schematic view of a schedule for processing a scheduled event in accordance with a second preferred embodiment of the present invention. A 120-minute schedule of playing multimedia video data includes Event 1, Event 2, Event 3, Event 4 and Event 1 arranged to be held at the $30^{th}$ minute, the $45^{th}$ minute, the $60^{th}$ minute, the $75^{th}$ minute and the $105^{th}$ minute respectively. Assuming that the multimedia video data is played up to the $15^{th}$ minute, a random access operation is executed, such that the playing position jumps from the 15$^{th}$ minute (at a first playing position) to the 90$^{th}$ minute (at a second playing position) (as indicated by the arrow B1 in FIG. 4). Then, the video playing system 1 detects Events 1 to 4 existing between the 15$^{th}$ minute and the 90$^{th}$ minute, and thus the playing position jumps to the playing position of Event 1 to execute Event 1 (as indicated by the arrow B2 in FIG. 4). After Event 1 is executed, the playing position jumps to the playing position of Event 2 to execute Event 2 (as indicated by the arrow B3 in FIG. 4). After Event 2 is executed, the playing position jumps to the playing position of Event 3 to execute Event 3 (as indicated by the arrow B4 in FIG. 4). After Event 3 is executed, the playing position jumps to the playing position 3 of Event 4 to execute Event 4 (as indicated by the arrow B5 in FIG. 4). After the scheduled events between the 30$^{th}$ minute and the 90$^{th}$ minute are executed sequentially, the playing position jumps to a playing position of the 90$^{th}$ minute to play the multimedia video data at that position (as indicated by the arrow B6 in FIG. 4), and then plays the multimedia video data at that position (as indicated by the arrow B7 in FIG. 4).

If the playing of multimedia video data is selected randomly, and a scheduled event exists between the first playing position and the second playing position, the video playing system or a computer will sequentially execute all scheduled events between the first playing position and the second playing position according to the executed computer readable recording medium. After the last scheduled event is executed, the playing position jumps to the second playing position to play the multimedia video data at that position.

In summation of the description above, the video playing system and the method thereof, and the non-transitory computer readable recording medium in accordance with the present invention are used for playing multimedia video data, so that when users operate and randomly navigate the contents of the multimedia video data, the scheduled event with an important blocking effect will not be skipped due to the randomly selected video data, but all scheduled events can be shown and executed, so that users can know clearly and navigate the contents of the multimedia video data. The present invention definitely can maintain the quality and integrity of the video playing.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A video playing method, for playing multimedia video data including at least one scheduled event, the method comprising the steps of:
   receiving a first playing position and a second playing position with respect to the multimedia video data;
   determining whether a scheduled event exists in the multimedia video data between the first playing position and the second playing position, wherein the scheduled event is used to be executed to perform a playback effect;
   determining by a processing unit if the scheduled event has a blocking effect, wherein if the scheduled event has the blocking effect, a playback effect for an entirety of the multimedia video data is restricted if the scheduled event having the blocking effect is unexecuted;
   jumping to the scheduled event from the first playing position if the scheduled event has the blocking effect;
   executing by the processing unit the scheduled event; and
   jumping to the second playing position to play the multimedia video data after the blocking effect of the scheduled event is executed.

2. The video playing method as recited in claim 1, wherein the scheduled event is the earliest scheduled event between the first playing position and the second playing position.

3. The video playing method as recited in claim 1, wherein the step of receiving a first playing position and a second playing position of the multimedia video data is executed by controlling a playing pointer in a video seeking bar.

4. The video playing method as recited in claim 1, further comprising a step of jumping to a second playing position to play the multimedia video data after the first scheduled event is executed.

5. The video playing method as recited in claim 1, wherein the scheduled event is an event selected from one of a picture in picture (PIP) event, a multiple views selection event, an interactive plot event, an evaluation and analysis event, and a function menu event, or a combination of such events.

6. The video playing method as recited in claim 1, wherein the multimedia video data is video data in a DVD format or an HD DVD format.

7. The video playing method as recited in claim 1, wherein the step of determining whether a scheduled event exists is executed by parsing a table comprising at least one record of position information with respect to the event.

8. The video playing method as recited in claim 1, wherein the step of determining if the scheduled event has a blocking effect is by analyzing forbiddance of user behaviors with respect to the multimedia video data.

9. A non-transitory computer readable recording medium, for driving a computer to execute the steps of:
   playing multimedia video data, including at least one scheduled event;
   detecting whether a random access operation of the played multimedia video data existing;
   retrieving a first playing position and a second playing position of the selected multimedia video data, if the random access operation of the played multimedia video data is existing;
   detecting if a scheduled event with a blocking effect exists between the first playing position and the second playing position, wherein the scheduled event is used to be executed to perform a playback effect, wherein if the scheduled event has the blocking effect, a playback effect for an entirety of the multimedia video data is restricted if the scheduled event having the blocking effect is unexecuted;
   executing the scheduled event with the blocking effect between the first playing position and the second playing position, if a scheduled event with the blocking effect exists between the first playing position and the second playing position; and
   jumping to the second playing position to play the multimedia video data after the blocking effect of the scheduled event is executed.

10. The computer readable recording medium as recited in claim 9, wherein a scheduled event between the first playing position and the second playing position is executed in such a way that the earliest scheduled event between the first playing position and the second playing position is executed, and then multimedia video data of the second playing position is played, after the earliest scheduled event is executed.

11. The computer readable recording medium as recited in claim 9, wherein a scheduled event between the first playing position and the second playing position is executed according to a sequence of occurrence of all scheduled events between the first playing position and the second playing position.

12. The computer readable recording medium as recited in claim 11, further comprising playing multimedia video data of the second playing position, after all of the scheduled events between the first playing position and the second playing position have been executed.

13. The computer readable recording medium as recited in claim 9, wherein the multimedia video data is video data in a DVD format or an HD DVD format.

* * * * *